Oct. 27, 1931.   H. O. EWING   1,829,557
TOOL
Filed Jan. 7, 1931
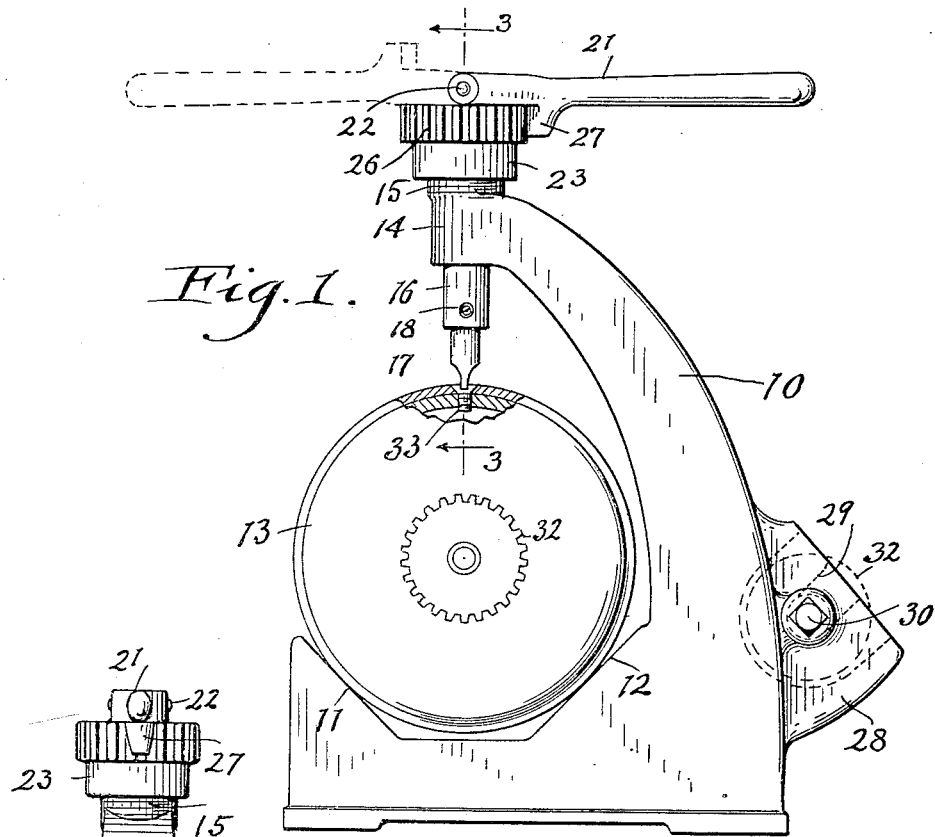
Fig.1.
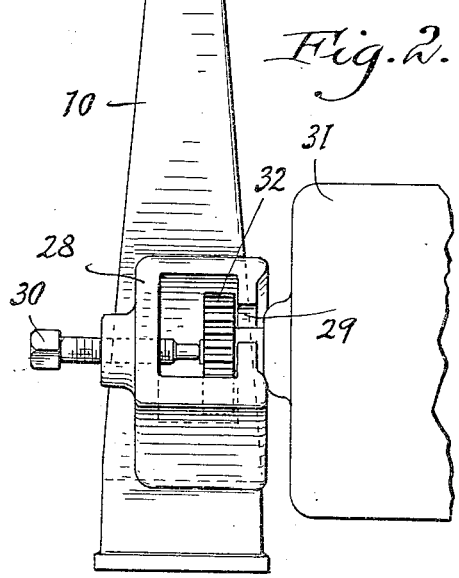
Fig.2.
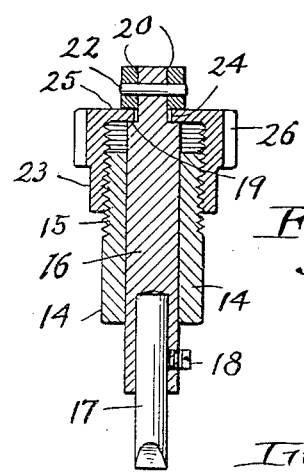
Fig.3.
Inventor
H. O. Ewing
Knox Hudson & Kent
attys Patented Oct. 27, 1931

1,829,557

UNITED STATES PATENT OFFICE

HERBERT O. EWING, OF MIDDLEPORT, OHIO, ASSIGNOR OF ONE-HALF TO THOMAS W. FIELD, OF CHARLESTON, WEST VIRGINIA

TOOL

Application filed January 7, 1931. Serial No. 507,098.

This invention relates to tools especially adapted for use in repairing automobile motors and generators and other special machinery.

It is one of the objects of the invention to provide a tool for conveniently and quickly removing and replacing the screws which secure the field coils and field ring of automobile motors and generators. These motors and generators are usually of cylindrical form and it has heretofore been a difficult and time consuming operation to remove the screws which hold the field coils, because of the difficulty of holding the motor or generator so that it will not roll. Even when the generator or motor is held in an ordinary vise, it is very difficult to remove the screws which hold the field coils because of the force required and the difficulty of holding a screw driver in proper alignment with the screw and in engagement with the kerf thereof.

This invention is especially useful in repairing the motors and generators of the smaller automobiles that are produced in large quantities because the large number of such automobiles in use results in frequent calls upon garages and automobile service stations to replace burned-out field coils and the ordinary garage and service station equipment is not adapted to handle this work conveniently and expeditiously.

It is a further object of the invention to provide a tool, of the type referred to, that will be simple in construction, low in manufacturing cost and adapted for handling the different types and sizes of motors and generators that garages and service stations are ordinarily called upon to repair.

Other objects of the invention and the features of novelty will be apparent from the following description, taken in connection with the accompanying drawings, of which, Figure 1 is a side elevation of a tool embodying my invention, a typical automobile generator being shown in connection therewith.

Fig. 2 is an elevation of the tool, as seen from the right of Fig. 1, a starting motor being shown in this view to illustrate the manner in which the tool is used to remove the pinion from the motor shaft.

Fig. 3 is a detail vertical section on the line 3—3 of Fig. 1.

Referring to the drawings, it will be noted that the tool comprises a substantially C-shaped frame 10, preferably in the form of a one-piece casting, the upper side of the base portion of which is provided with the upwardly diverging surfaces 11 and 12 on which the motor or generator, indicated at 13, is adapted to be seated when the tool is in use. At the upper end of the frame 10 there is an integral vertically extending sleeve 14 the axis of which is centrally arranged with respect to the surfaces 11 and 12. The sleeve 14 is externally threaded as indicated at 15 and bored out to receive the shaft 16 which is rotatable and slidable therein. The shaft 16 is provided with a socket in its lower end to receive the screwdriver 17 which may be secured by means of a set screw 18. The upper end of the shaft 16 is reduced in diameter to form a shoulder 19 and has the flattened sides 20 to which the bifurcated end of a lever 21 is connected by means of a pivot 22. The lever 21 is adapted to be swung on the pivot 22 from the full line position to the dotted line position, shown in Fig. 1.

An internally threaded cap 23 has an opening 24 in its end wall 25, through which the upper end of the shaft 16 projects and, from Fig. 3, it will be noted that this cap is loosely secured to the shaft 16 by having the end wall 25 confined between the shoulder 19 and the lever 21. The cap 23 is provided with a series of peripheral lugs 26 and the lever 21 has a lug 27 that is adapted to be positioned between any two of these lugs to form an interlocking connection between the lever and the cap, when the lever is in the full line position shown in Fig. 1. With the lever in this position the shaft 16 and the cap 23 may be rotated by the lever, as a unit. When the lever 21 is swung to the dotted line position, in Fig. 1, the shaft 16 and the cap 23 may be rotated independently of each other.

On the rear side of the frame 10 there is an integral boss 28 having a slot 29 in one of its side walls and a set screw 30 in the opposite side wall. When it is desired to remove the pinion from the shaft of a motor or generator 31, shown in Fig. 2, the motor or generator is placed in the position shown with the pinion, which is indicated at 32, inside the boss 28. The set screw 30 may then be rotated by means of a wrench to push the shaft of the motor or generator out of the pinion.

In using the tool for the purpose of removing or replacing the screws which secure the field coils to the field ring of the motor or generator, the latter is positioned, as shown at 13 in Fig. 1, with the screw, to be removed, directly beneath the screw-driver as indicated at 33. The cap 23 is then rotated, either by the lever 21 or independently thereof, to lower the screw-driver 17 into engagement with the screw 33. The lever 21 is then positioned as shown in full lines in Fig. 1, and rotated to remove the screw 33. The pitch of the threads 15 is preferably made the same as that of the threads of the screw 33 so that, as the screw is removed the screw-driver 17 will move upwardly with the screw 33 and the engagement of the screw-driver with the screw will be maintained.

When it is desired to replace a field coil in the field ring of the motor or generator 13 the screw 33 is inserted in the opening in the field ring and the operator, with one hand, holds the field coil in position to receive the screw 33. The lever 21 is then rotated to run the screw 33 into the field coil and thereby secure the field ring in position.

By swinging the lever over to the dotted line position, in Fig. 1, the cap 23 will then be free for rotation independently of the lever so as to permit convenient and rapid rotation of the cap for the purpose of quickly adjusting the screw-driver 17 to any desired position.

Having thus described my invention, I claim:

A tool, for removing and replacing the screws of generators and the like, consisting of a one-piece substantially C-shaped frame the base portion of which is provided with upwardly diverging surfaces on its upper side to form a seat for the generator or the like, said frame also having an integral externally threaded vertically extending sleeve arranged above said surfaces and with its axis centrally thereof, a shaft rotatably and slidably mounted in said sleeve, the lower end of said shaft being adapted to have a screw-driver attached thereto and the upper end having a shoulder, an internally threaded cap engaging the external threads of said sleeve and having its upper end closed by a wall through which the upper end of said shaft projects, a lever pivoted to the upper end of said shaft and cooperating with said shoulder to loosely secure said cap to the shaft, said cap being provided with a series of peripheral lugs and said lever having means to engage said lugs and form an interlocking connection between the lever and the cap whereby said shaft and cap may be rotated as a unit by said lever, said lever being adapted to be swung in a vertical plane about its pivoted connection with said shaft to a position in which it is disengaged from said lugs and the shaft and said cap may be independently rotated as and for the purpose described.

In testimony whereof I hereunto affix my signature.

HERBERT O. EWING.